United States Patent [19]

Heitmann

[11] Patent Number: 4,462,049

[45] Date of Patent: Jul. 24, 1984

[54] PROCESS FOR PRODUCING A VIDEO SIGNAL RECORDED ON A RECORD CARRIER

[75] Inventor: Jürgen Heitmann, Seeheim, Fed. Rep. of Germany

[73] Assignee: Robert Bosch GmbH, Stuttgart, Fed. Rep. of Germany

[21] Appl. No.: 323,353

[22] Filed: Nov. 20, 1981

[30] Foreign Application Priority Data

Dec. 3, 1980 [DE] Fed. Rep. of Germany ....... 3045541

[51] Int. Cl.³ ...................... H04N 5/783; G11B 21/10
[52] U.S. Cl. .................................. 360/10.2; 360/10.3; 360/33.1; 360/77
[58] Field of Search ............ 358/335; 360/10.1, 10.2, 360/10.3, 70, 75, 77, 64, 32, 84, 85, 33.1

[56] References Cited

U.S. PATENT DOCUMENTS

| | | | |
|---|---|---|---|
| 3,921,132 | 11/1975 | Baldwin | 360/33.1 |
| 4,139,867 | 2/1979 | Foerster | 360/10.3 |
| 4,210,938 | 7/1980 | Heitmann | 360/10.3 |
| 4,233,637 | 11/1980 | Kubota | 360/10.2 |
| 4,293,879 | 10/1981 | Heitmann | 360/10.3 |
| 4,328,518 | 5/1982 | Kawata | 360/10.3 |

Primary Examiner—Alan Faber
Attorney, Agent, or Firm—Frishauf, Holtz, Goodman & Woodward

[57] ABSTRACT

To reproduce a video signal recorded in a plurality of individual inclined tracks on a magnetic tape by a head-wheel, the information content of each television picture is distributed over a plurality of the tracks and the reproduction is effected at a different tape speed from that of recording.

Each head at the periphery of the head-wheel is deflectable in a direction perpendicular to the plane in which the head-wheel rotates, and at all times at least two heads are simultaneously in contact with the tape. The deflection of each head is controlled in such manner that at any given time at least one of the two heads in contact with the tape is guided along a recorded track, and reproduced picture information is continuously available in correct sequence by selective switching of the outputs from the magnetic heads.

6 Claims, 5 Drawing Figures

PROCESS FOR PRODUCING A VIDEO SIGNAL RECORDED ON A RECORD CARRIER

This invention relates to a process for reproducing a video signal recorded on a recorder carrier.

BACKGROUND

In conventional magnetic tape video recorders, the video signal is recorded by a rotating head-wheel in a plurality of individual tracks which extend at an angle to the longitudinal direction of the magnetic tape, the particular angle depending on the recording process being used.

If signals recorded in such a manner are required to be reproduced at a different speed, it being required to preserve the standard of the recorded signals, it occurs that the tracks described by the magnetic heads on playback do not coincide with the recorded tracks because of the different speed at which the magnetic tape is being transported.

Furthermore, individual portions of the signal will be reproduced in incorrect sequence in the case of recording processes in which each television picture is distributed over a plurality of tracks.

Accordingly, known processes (for example German Patent Specifications DE-OS No. 26 42 019 to which U.S. Pat. No. 4,139,867 corresponds, DE-OS No. 27 25 365 to which U.S. Pat. No. 4,210,938 corresponds and DE-OS No. 28 41 728 to which U.S. Pat. No. 4,293,879 corresponds) a picture-store into which is written the signal as taken from the magnetic tape, and from which the signal is read out in proper sequence in accordance with the relevant television standard. In these known processes, however, part of the signal cannot be evaluated due to the magnetic head crossing from one recorded track to another.

THE INVENTION

It is an object to provide a process wherein the recorded signal may be reproduced without the use of a picture-store at a speed different from that of the recording and in accordance with the television standard being used in any particular case.

Accordingly, the present-invention provides a process for reproducing a video signal recorded in a plurality of individual tracks on a record carrier by a rotating head-wheel having a plurality of circumferential recording/reproducing heads, the information content of each television picture being distributed over a plurality of the tracks and the reproduction being effected at a speed different from that of recording. Each head at the circumference of the head-wheel is deflectable in a direction perpendicular headwheel plane, i.e., parallel to the axis of rotation of the head-wheel, wherein at all times at least two heads on the head-wheel are simultaneously in contact with the record carrier, and wherein the deflection of each head on the head-wheel is controlled in such manner that at any given time at least one of the said two heads in contact with the record carrier is guided along a recorded track.

The process according to the invention has the advantage that reproduction can take place in expanded or compressed time without the use of a picture-store with television magnetic tape recorders in which a half-picture or is distributed over a plurality of tracks.

BRIEF DESCRIPTION OF THE DRAWINGS

An embodiment of the invention will now be described, by way of example, with reference to the accompanying drawings, in which:

FIG. 4b is a side view of the headwheel of FIG. 4a.

DESCRIPTION OF THE PREFERRED EMBODIMENT

Figure 1:
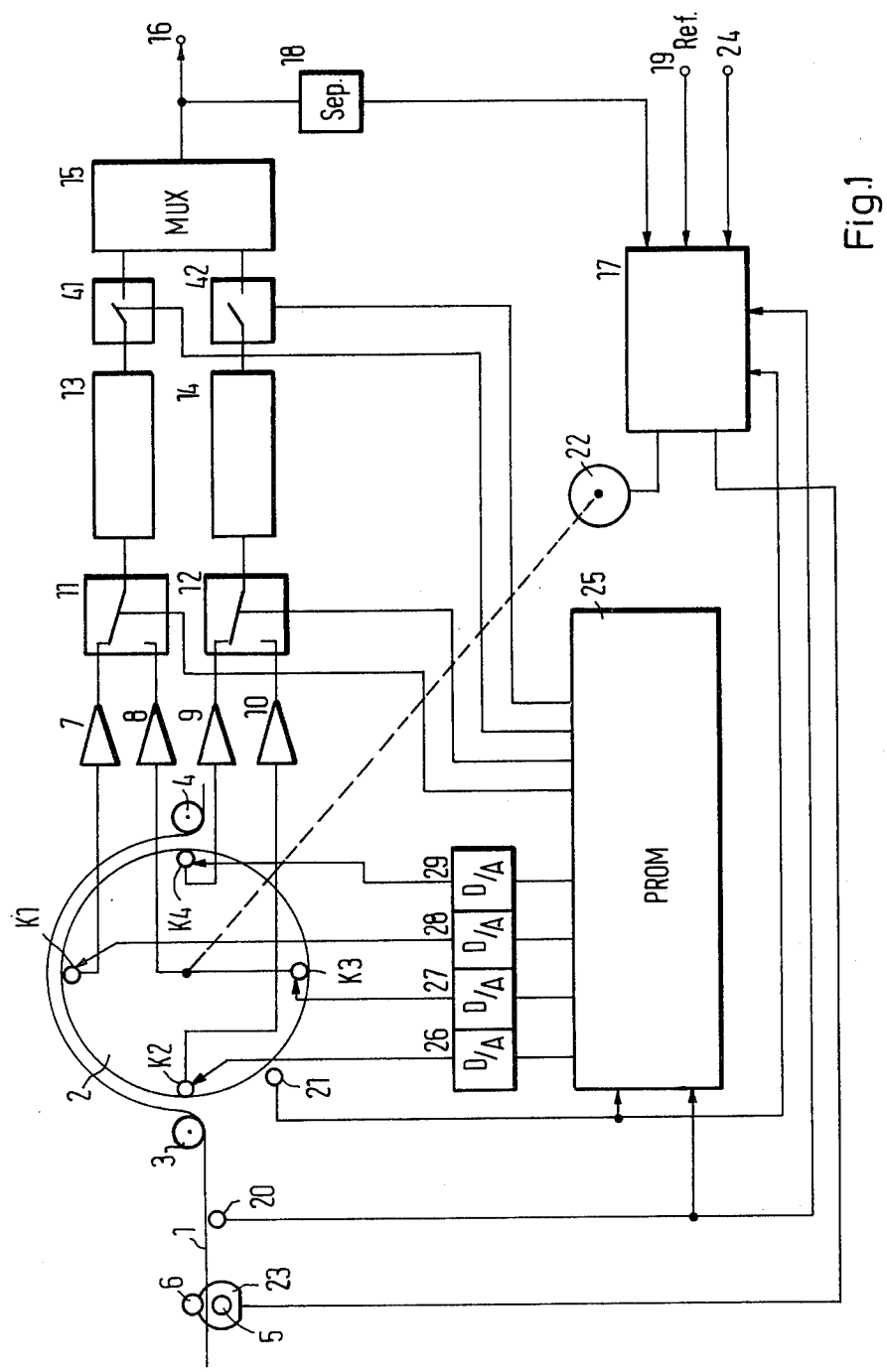
FIG. 1 is a schematic diagram of an embodiment of an arrangement for performing the invention.

In the arrangement shown in FIG. 1, a magnetic tape 1 is looped helically through an angle of slightly more than 180° round a cylindrical scanning device including a rotating head-wheel 2. Of the various tape-guide elements which are present, the only ones shown are the direction rollers 3 and 4 and a capstan 5 together with its associated pressure roller 6. The mechanical details of the apparatus, such as the upper and lower guide drums of the cylindrical scanning device between which the head-wheel rotates, and the take-up and supply spools, and also the electrical circuits required in order to operate the magnetic tape recorder, correspond fundamentally to those used in known arrangements, and are described in the following only to the extent necessary for an understanding of the invention or where they differ from known arrangements. Four magnetic recording/reproducing heads K1, K2, K3 and K4 are distributed symmetrically at the circumference of the head-wheel 2. Although the invention is suitable for analogue television signals, the following description assumes that digital recording is used, in which the digital signal is distributed over two channels in order to reduce the bit rate to be recorded and reproduced with any one head.

Figure 2:
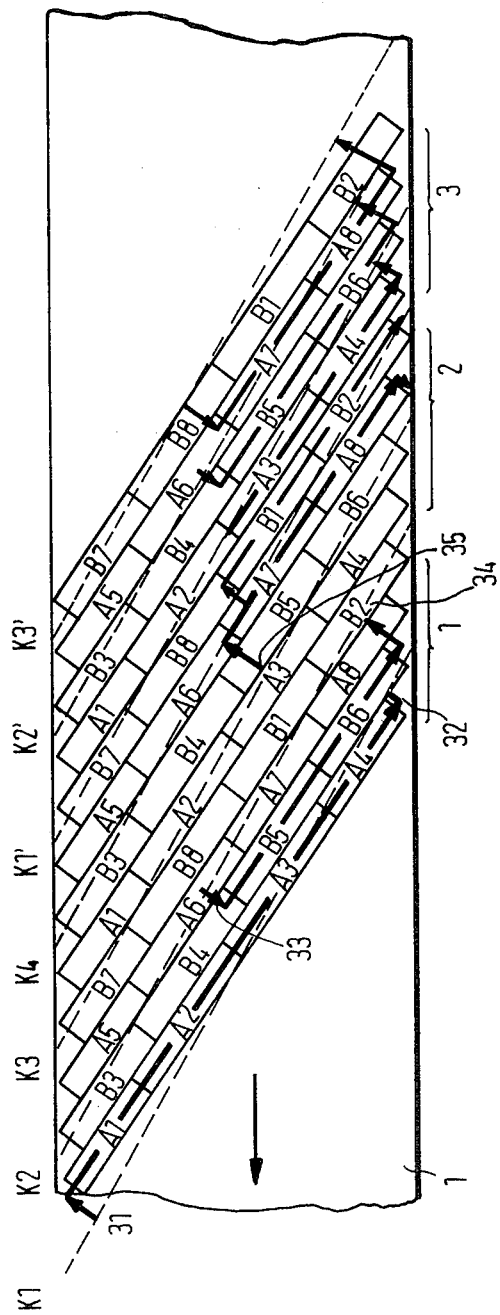
FIG. 2 is a simplified schematic diagram of the layout of the recorded and scanned tracks on a magnetic tape when using the arrangement of FIG. 1.

A track layout produced by such recording at normal speed is shown in FIG. 2. This layout derives from the assumption that the signal belonging to each channel A and B is recorded by a respective pair of oppositely disposed heads, that is to say the heads K1 and K3 record channel A and the heads K2 and K4 record channel B. For clarity the individual tracks are illustrated in FIG. 2 both considerably wider and at a greater angle to the edge of the tape than would occur in practice. Furthermore, it is sufficient for the purposes of the present description to assume that a television picture (of which only three are shown) comprises only 8 lines. Thus the individual lines of the tracks are referenced according to their association with each channel A or B, and to their association with the television raster, by A1 to A8 and B1 to B8. Finally, in the preferred form of the invention, the digital information is allocated to the individual channels A and B by recording the pulse-code-modulated amplitude values of successive picture points in channels A and B alternately.

When the track-layout illustrated in FIG. 2 is now scanned for reproduction at normal speed, lines A1 and A2 on the first track are for example scanned with the head K1. Upon the transition of the head K1 from line A2 to line A3 after one quarter revolution, head K2 comes into contact with the tape, so that the lines B3 and B4 on the adjacent track are scanned by this head K2 simultaneously with the scanning of the lines A3 and A4 on the first track by the head K1. The complete digital information of the third and fourth lines is thus obtained simultaneously from both channels A and B. After the next quarter revolution, head K3 comes into contact with the tape, and thereafter scans the lines A5 and A6 while head K2 is simultaneously scanning the lines B5 and B6. This process continues and by inspection it will be seen that the corresponding lines belonging to channels A and B are scanned simultaneously for all tracks. The signals thus produced by heads K1 to K4 are amplified in respective amplifiers 7, 8, 9 and 10 (FIG. 1) and fed via change-over switches 11 and 12 to buffer stores 13 and 14, the latter serving among other things to compensate for time-errors. However, this aspect is sufficiently well known in connection with conventional magnetic tape video recorders not to require further description here. The signals of the two channels A and B are combined in a multiplexer 15, and are available at an output 16.

As in the case of known magnetic tape video recording apparatus there is a control system 17 which receives as input the synchronising portion of the signals reproduced from the magnetic tape 1 via a sync separator 18, a reference signal provided at an input 19, information regarding the position of the magnetic tape taken from a control track by a head 20, and head-wheel pulses provided by a head 21. Both the head-wheel motor 22 and the capstan motor 23 are connected to respective outputs of the control system 17, so that the movements of the magnetic tape 1 and of the head-wheel 2 are coupled both to one another and to the reference timing fed in at 19.

In order to reproduce the recorded signals at a speed different from that of recording, a suitable signal is fed to the control system 17 via an input 24. While the head-wheel continues to rotate at a speed corresponding to the television standard, the speed of the magnetic tape is altered in accordance with the desired playback speed. The relationships thus produced when the previously recorded tracks are scanned at a higher tape speed are now explained with the aid of FIG. 2, the magnetic tape 1 being moved in the direction of the arrow. Whereas the paths described by the heads coincide with the recorded tracks in the case of reproduction at normal speed, the paths which would, but for the present invention, be described by the magnetic heads K1 to K4 in the case of reproduction at about double the tape speed are those designated by K1 to K4. In consequence of the increased speed, the angle of k1 to k4 with respect to the edge of the tape is smaller than that of the recorded tracks. In addition, their clearance (lateral separation) is greater than that of the recorded tracks. Since the heads are arranged with 90° spacing on the head-wheel, head K2 for example is at the middle of its scanning path k2 when head K1 leaves the tape. At this instant, head K3 on its path k3 comes into contact with the tape. Since the magnetic tape 1 is looped through slightly more than 180° round the head-wheel, there is a resultant overlap in time at the ends of the paths described by the heads, so that a continuous information flow can be obtained.

As may be seen from FIG. 1, the paths k1 to k4 of the heads coincide only briefly and intermittently with the recorded tracks. In the process according to the invention, therefore, the heads are deflected in a direction perpendicular to their scanning paths (i.e. parallel to the axis of rotation) in such a manner that at least one of the heads in engagement with the tape follows a recorded track at any given time. Thus in the present example the head K1 is deflected, starting from the point designated by 31 of the path k1, in such a manner that it follows the lines A1 and A2 of the first picture. This direction is hereinafter called the positive direction, and for the head K1 the degree of deflection decreases along the lines A1 and A2. During the course of scanning the line A3 of the first picture, the head K1 acquires a negative deflection, which progressively increases in accordance with the difference between the recorded track and the path k1 as far as the point 32.

In order to acquire sufficient information for the reproduction of a television picture, it is necessary that the line A4 be followed by a 5th, 6th, 7th and 8th lines, in that order, in the case of the eight-line television picture illustrated as an example. For this purpose, head K2 is deflected in the negative direction from point 33 onwards of its path k2, so that it scans the lines B5 and B6 of the first picture. When head K2 has reached point 34, the 7th and 8th lines are next required, and these are scanned by head K3 which is deflected at the latest at point 35 of its path k3 on to the line A7 of the second picture, and scans the latter together with the following line A8.

In the case of the example described above, simultaneous scanning of both channels is dispensed with at the increased speed, individual lines being taken in the correct order but from only one channel at a time. This results in a reduction in picture quality, but this is, however, quite permissible when operating in this manner. However, the process according to the invention also enables both channels to be scanned, which can be done at certain speeds without further measures, but the result at high playback speeds is on the one hand that head deflections become relatively great, and on the other hand that many recorded television pictures are required in order to obtain one reproduced television picture.

In the case of the example illustrated in FIG. 2, the first four tracks belong to picture 1, the second four to picture 2 and the last four to picture 3. At the playback speed shown, lines 7 and 8 of the first reproduced picture are thus already taken from recorded picture 2.

Figure 3:
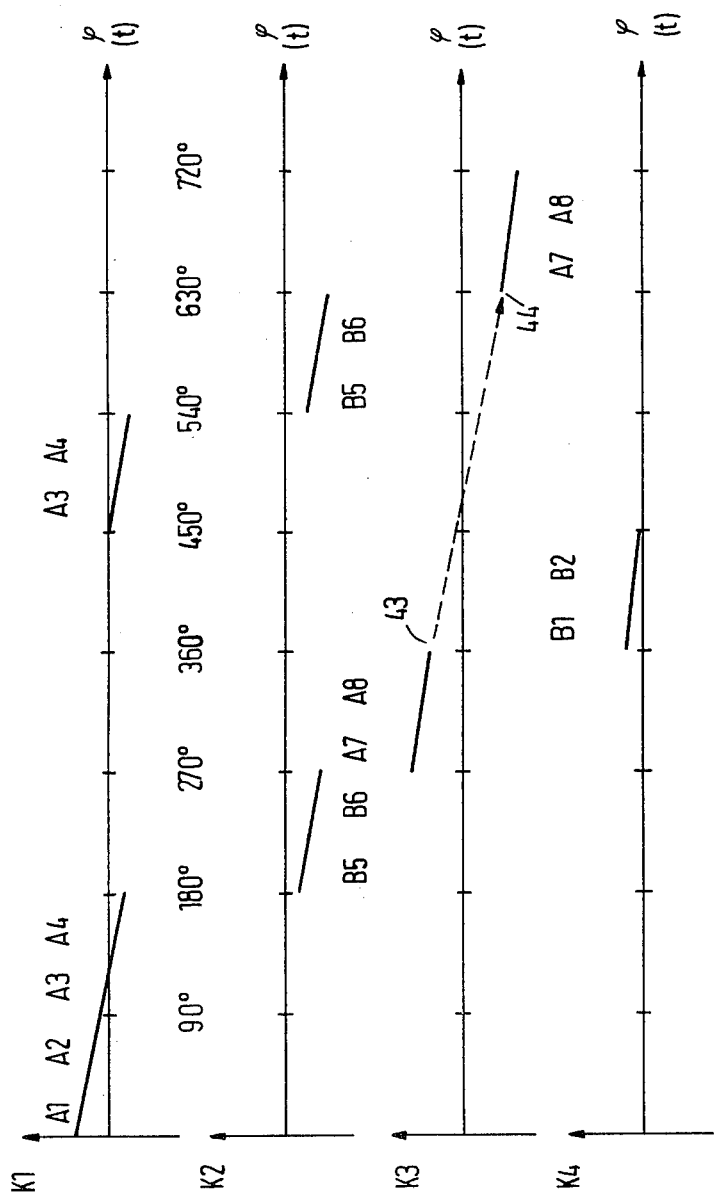
FIG. 3 is a time-diagram of the deflection of the individual magnetic heads of the head-wheel in the arrangement of FIG. 1 when performing the scanning shown in FIG. 2.

FIG. 3 shows the required deflections of heads K1 to K4 resulting from the scanning procedure in FIG. 2 as a function of the angular position of the head-wheel. Since the head-wheel rotates at a constant speed corresponding to the television standard, this likewise signifies a time-scale.

FIGS. 2 and 3 also show the deflections required to produce the next following television picture to that discussed in detail above. This is produced by heads K4 (lines B1 and B2), K1 (lines A3 and A4), K2 (lines B5 and B6) and K3 (lines A7 and A8) in that order. These lines are taken from the second and third recorded pictures, the paths k1', k2' and k3' being the next following paths traversed on the tape by the heads K1, K2 and K3 respectively.

It is to be understood that although FIGS. 2 and 3 only show the derivation of two reproduced pictures, the sequence of deflections can be continued indefinitely to the right in FIG. 3 to provide a series of reproduced high speed television pictures. Provided that the ratio of the tape speed upon reproduction to the tape speed of recording is an integer or rational fraction, the pattern of the sequence of deflections will be cyclic so that it is possible to store the cycle of deflections for any given tape speed for subsequent control of the deflection of the heads.

The head deflections are chosen so as to reduce to a minimum the maximum deflection of any head. Thus, referring to FIG. 2, it would be possible to obtain the 5th to the 8th lines of the first reproduced picture by a negative deflection of head K3 onto lines A5 to A8 of the first recorded picture (third track from the left). However, the maximum deflection of head K3 would in this case have been much greater than the maximum deflection of either of the heads K2 and K3 in the procedure actually adopted. In FIGS. 2 and 3, the maximum deflection required of any head is reduced by providing that successive contributions to the final output are provided by heads which, on recording, were alternatively allocated to the two channels A and B.

This provides the further advantage, seen in FIG. 3, that the heads can be moved relatively slowly from one track to another. For example, for the head K3 a period equal to $\frac{3}{4}$ of a revolution of the head-wheel 2 is available in order to pass from position 43 to position 44. Wherein the relationship between the recording and reproducing tape speeds is relatively simple, for example if the reproduction speed is exactly twice the recording speed, it is possible to provide identical deflection signals to each pair of opposite heads K1, K3 and K2, K4.

In order that heads K1 to K4 may be controlled as in FIG. 3 above, the magnitudes and directions of the deflections required of the individual heads are stored, in the case of the arrangement in FIG. 1, in a programmable read-out memory (PROM) 25 at addresses which are a function of the angular position of the head-wheel and a function of tape position. Upon reproduction the PROM is fed with information concerning the tape position and the angular position of the head-wheel by the heads 20 and 21, so that the desired deflections shown in FIG. 3 are provided at the outputs of the PROM as digital control signals which are fed to the individual heads via digital-analogue converters 26 to 29. Furthermore, information is stored in the PROM as to when which of the heads K1 to K4 is following a track from which information is desired as output, with the result that the switches 11, 12, 41 and 42 are controlled in such a manner as to provide a continuous stream of reproduced information in correct sequence at the output 16.

Figure 4B:
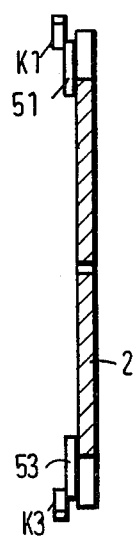
Figure 4A:
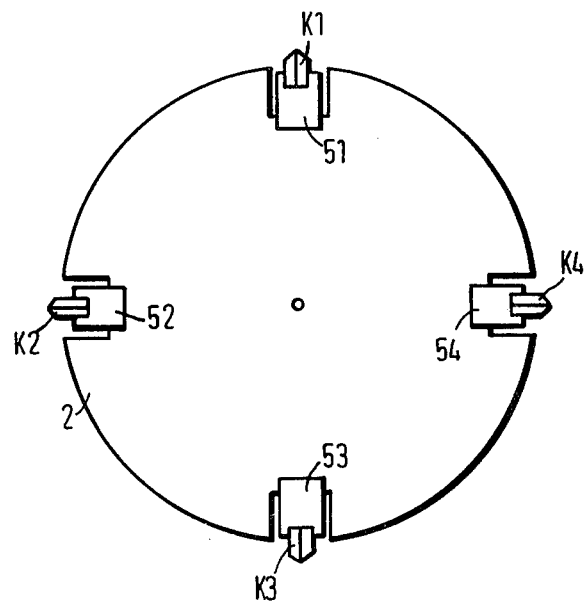
FIG. 4a is a schematic top view of head-wheel suitable for use in the apparatus of FIG. 1.

FIGS. 4a and 4b show a head-wheel 2 suitable for carrying out the above process in the apparatus of FIG. 1. The heads K1 to K4 are mounted on respective piezoelectric platelets 51, 52, 53 and 54 which deflect the heads parallel to the axis of the head-wheel in accordance with the control voltage which is fed to electrodes (not shown) by the digital-to-analogue converters 26 to 29.

I claim:

1. A process for reproducing a video signal recorded in a plurality of individual tracks on a magnetic tape by a rotating head-wheel having a plurality of circumferential magnetic recording/reproducing heads, wherein
   the magnetic tape helically loops the head-wheel, and the individual tracks are inclined to the longitudinal direction of the tape,
   said process, in accordance with the invention, reproducing the information content of each television field distributed over a plurality of the tracks, and
   the reproduction being effected at a speed different from that of recording, comprising the combination of steps of deflecting each head at the circumference of the head-wheel in a direction perpendicular to the plane;
   maintaining at all times at least two heads on the head-wheel simultaneously in contact with the tape;
   controlling the deflection of each head on the head-wheel in such manner that at any given time at least one of the said two heads in contact with the tape is guided along a recorded track; and
   selectively switching the outputs from said heads in such manner that reproduced picture information is continuously available in correct sequence from the outputs of the magnetic heads.

2. A process according to claim 1, wherein the steps of controlling the deflection of the heads and the switching of the heads for providing the said information in correct sequence is effected in such manner as to reduce to a minimum the maximum deflection of any head from its undeflected position.

3. A process according to claim 1 or 2, wherein the heads are symmetrically arranged around the periphery of the head-wheel with a separation substantially equal to one half the angle by which the tape loops the head-wheel.

4. A process according to claim 3, wherein two pairs of oppositely disposed heads are arranged at the periphery of the head-wheel and each of the heads is fed with a control signal which produces the required deflection at any given time.

5. A process according to claim 4, wherein the heads of each pair are fed with an identical control signal.

6. A process according to claim 1, wherein the video signal is recorded in digital form in two channels by at least one respective head allocated to each channel, and wherein successive heads used in the provision of the reproduced picture information were alternatively allocated to the two different channels when recording.

* * * * *

UNITED STATES PATENT AND TRADEMARK OFFICE
CERTIFICATE OF CORRECTION

PATENT NO. : 4,462,049
DATED : July 24, 1984
INVENTOR(S) : Jurgen HEITMANN

It is certified that error appears in the above-identified patent and that said Letters Patent is hereby corrected as shown below:

Claim 1, Column 6, line 19, before "plane" insert the words -- head-wheel --.

Signed and Sealed this

Twenty-eighth Day of May 1985

[SEAL]

Attest:

DONALD J. QUIGG

Attesting Officer        Acting Commissioner of Patents and Trademarks